US012732955B2

(12) United States Patent
Hong

(10) Patent No.: US 12,732,955 B2
(45) Date of Patent: Sep. 8, 2026

(54) INFORMATION SENDING METHOD, PAGING LIMITING METHOD, AND COMMUNICATION APPARATUS

(71) Applicant: Beijing Xiaomi Mobile Software Co., Ltd., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 316 days.

(21) Appl. No.: 18/292,225

(22) PCT Filed: Jul. 27, 2021

(86) PCT No.: PCT/CN2021/108759
§ 371 (c)(1),
(2) Date: Jan. 25, 2024

(87) PCT Pub. No.: WO2023/004602
PCT Pub. Date: Feb. 2, 2023

(65) Prior Publication Data

US 2024/0284400 A1 Aug. 22, 2024

(51) Int. Cl.
*H04W 68/02* (2009.01)
*H04W 8/18* (2009.01)
*H04W 60/04* (2009.01)
*H04W 76/20* (2018.01)

(52) U.S. Cl.
CPC ........... *H04W 68/02* (2013.01); *H04W 8/183* (2013.01); *H04W 60/04* (2013.01); *H04W 76/20* (2018.02)

(58) Field of Classification Search
None
See application file for complete search history.

(56) References Cited

U.S. PATENT DOCUMENTS 12,245,188 B2 * 3/2025 Bao ........................ H04W 68/02
12,302,231 B2 * 5/2025 Kumar .................. H04W 68/12
12,425,834 B2 * 9/2025 Jin ........................ H04W 8/183
(Continued)

FOREIGN PATENT DOCUMENTS

CN 105554884 A 5/2016
CN 107509201 A 12/2017
(Continued)

OTHER PUBLICATIONS

State Intellectual Property Office of the People's Republic of China, Office Action and Search Report Issued in Application No. 2021800022884, Dec. 28, 2024, 19 pages. (Submitted with Machine Translation).

(Continued)

*Primary Examiner* — Gregory B Sefcheck
*Assistant Examiner* — Benjamin Peter Welte
(74) *Attorney, Agent, or Firm* — Volpe Koenig

(57) ABSTRACT

An information sending method, a paging restriction method, communication apparatuses, and storage media that improve paging in a wireless communication system. The paging is improved by: sending inactive paging restriction information to a network-side device, where the inactive paging restriction information is configured to indicate a condition for the network-side device to restrict paging of the terminal when the terminal is in an inactive state.

20 Claims, 3 Drawing Sheets

(56) References Cited

U.S. PATENT DOCUMENTS

| | | | |
|---|---|---|---|
| 2016/0029343 A1 | 1/2016 | Quan et al. | |
| 2018/0124741 A1 | 5/2018 | Lu | |
| 2018/0124868 A1* | 5/2018 | Gupta | H04W 36/362 |
| 2020/0037380 A1 | 1/2020 | Qiu et al. | |
| 2021/0105866 A1 | 4/2021 | Kavuri et al. | |
| 2021/0345292 A1 | 11/2021 | Bao et al. | |
| 2022/0272660 A1* | 8/2022 | Luetzenkirchen | H04W 76/30 |

FOREIGN PATENT DOCUMENTS

| | | | |
|---|---|---|---|
| CN | 107637146 | A | 1/2018 |
| CN | 110012520 | A | 7/2019 |
| CN | 111278106 | A | 6/2020 |
| CN | 111556565 | A | 8/2020 |
| CN | 112425225 | A | 2/2021 |
| CN | 112514472 | A | 3/2021 |
| CN | 112788745 | A | 5/2021 |
| CN | 113678524 | A | 11/2021 |
| WO | 2014101751 | A1 | 7/2014 |
| WO | 2020/029560 | A1 | 2/2020 |
| WO | 2020/209620 | A1 | 10/2020 |
| WO | 2021083353 | A1 | 5/2021 |
| WO | 2021120018 | A1 | 6/2021 |

OTHER PUBLICATIONS

Vodafone et al, "Function Description for Multi-USIM devices—TAU rate limit", 3GPP TSG-SA2 Meeting # 144E (e-meeting), S2-2102897, Elbonia, Apr. 12-16, 2021, 3 pages.

ISA State Intellectual Property Office of the People's Republic of China, Written Opinion of the International Searching Authority Issued in Application No. PCT/CN2021/108759, Mar. 28, 2022, WIPO, 9 pages.

ISA State Intellectual Property Office of the People's Republic of China, International Search Report Issued in Application No. PCT/CN2021/108759, Mar. 28, 2022, WIPO, 6 pages.

* cited by examiner

INFORMATION SENDING METHOD, PAGING LIMITING METHOD, AND COMMUNICATION APPARATUS

CROSS REFERENCE TO RELATED APPLICATIONS

This application is a U.S. national phase application of International Application No. PCT/CN2021/108759, filed on Jul. 27, 2021, the disclosure of which is incorporated herein by reference in its entirety for all purposes.

BACKGROUND

With the development of communication technology, there are more and more types of user equipment (UE), and different types of UE can have different tendencies to service requirements.

In order to perform the communication of a certain service, it is generally necessary to page a UE by a base station first. However, the UE may not want to receive paging in some cases. For example, if the UE expects to perform a type A service, but the base station sends paging for type B service to the UE, the UE may not respond to the paging. This results in a waste of base station resources and may affect the communication of the UE.

SUMMARY

The present disclosure relates to the field of communication technology, and in particular to an information sending method, a paging restriction method, communication apparatuses, and computer readable storage media.

According to a first aspect of the embodiments of the present disclosure, there is provided an information sending method, performed by a terminal. The method includes: sending inactive paging restriction information to a network-side device, where the inactive paging restriction information is configured to indicate a condition for the network-side device to restrict paging of the terminal when the terminal is in an inactive state.

According to a second aspect of the embodiments of the present disclosure, there is provided a paging restriction method, performed by a network-side device. The method includes: receiving inactive paging restriction information, where the inactive paging restriction information is configured to indicate a condition for the network-side device to restrict paging of a terminal when the terminal is in an inactive state.

According to a third aspect of the embodiments of the present disclosure, there is provided a communication apparatus, including: a processor; and a memory configured to store a computer program. When the computer program is executed by the processor, the above information sending method is implemented.

According to a fourth aspect of the embodiments of the present disclosure, there is provided a communication apparatus, including: a processor; and a memory configured to store a computer program. When the computer program is executed by the processor, the above-mentioned paging restriction method is implemented.

According to a fifth aspect of the embodiments of the present disclosure, there is provided a computer readable storage medium for storing a computer program. The steps in the information sending method described above are implemented when the computer program is executed by a processor.

According to a sixth aspect of the embodiments of the present disclosure, there is provided a computer readable storage medium for storing computer programs. The steps of the paging restriction method described above are implemented when the computer program is executed by a processor.

BRIEF DESCRIPTION OF THE DRAWINGS

In order to explain technical solutions in embodiments of the present disclosure more clearly, accompanying drawings described in the embodiments will be briefly introduced below. Obviously, the accompanying drawings described as below are only some embodiments of the present disclosure. Those skilled in the art may obtain other drawings on the basis of these drawings without creative work.

DETAILED DESCRIPTION OF THE EMBODIMENTS

The technical solutions in embodiments of the present disclosure will be described clearly and completely in combination with the accompanying drawings in the embodiments of the present disclosure. It is obvious that the embodiments described are only part of embodiments in the present disclosure, rather than all embodiments. On the basis of the embodiments of the present disclosure, all other embodiments obtained by those skilled in the art without creative work are within the protection scope of the present disclosure.

The terms used in the present disclosure are for the purpose of describing particular examples only, and are not intended to limit the present disclosure. Terms "a" and "the" in their singular forms in the examples of the present disclosure and the appended claims are also intended to include their plural forms, unless clearly indicated otherwise in the context. It should also be understood that the term "and/or," as used in the description, refers to and includes any and all possible combinations of one or more of the associated listed items.

It is to be understood that although the terms "first," "second," "third," and the like may be adopted in the examples of the present disclosure to describe various information, the information should not be limited to these terms. These terms are only used to distinguish the information of the same type from each other. For example, without departing from the scope of the present disclosure, first information may be referred to as second information; and similarly, second information may also be referred to as first information. Depending on the context, the word "if" as used herein may be interpreted as "when," "upon," or "in response to determining."

For the purpose of brevity and ease of understanding, the terms "greater than," "less than," "higher than," or "lower than" are used herein when characterizing the relationship of magnitudes. However, for those skilled in the art, it can be understood that the term "greater than" also covers the meaning of "greater than or equal to" and the term "less than" also covers the meaning of "less than or equal to" the term "higher than" covers the meaning of "higher than or equal to," and the term "lower than" also covers the meaning of "lower than or equal to."

Figure 1:
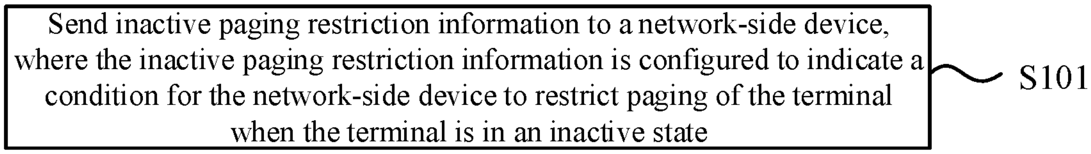
FIG. 1 is a schematic flowchart of an information sending method according to an embodiment of the present disclosure.

FIG. 1 is a schematic flowchart of an information sending method according to an embodiment of the present disclosure. The information sending method shown in this embodiment can be performed by a terminal. The terminal includes but is not limited to a communication device such as a mobile phone, a tablet computer, a wearable device, a sensor, and an Internet of Things (IoT) device. The terminal can communicate with a network-side device as a user equipment (UE). The network-side device includes, but is not limited to, a base station and a core network. The base station and the core network include but are not limited to the base station and the core network in a communication system such as 4G, 5G, and 6G.

As shown in FIG. 1, the information sending method can include step S101.

In step S101, inactive paging restriction information is sent to a network-side device, where the inactive paging restriction information is configured to indicate a condition for the network-side device to restrict paging of the terminal when the terminal is in an inactive state.

In an embodiment, the terminal can determine its own paging tendency in an inactive state, such as allowing reception of paging for a target type of service and not allowing reception of paging for other types of service. Further, the inactive paging restriction information can be generated based on the paging tendency, and the inactive paging restriction information can be sent to the network-side device, so that the network-side device can determine the condition for restricting paging of the terminal when the terminal is in the inactive state based on the inactive paging restriction information. When the terminal is in the inactive state and needs to be paged, it can be determined whether to page the terminal according to the condition, thereby avoiding unnecessary paging and waste of network-side device resources, and avoiding the influence on terminal communication.

In an embodiment, the terminal can be a single-card terminal or a multi-card terminal.

In an embodiment, when the terminal is a single-card terminal, there is a subscriber identity module (SIM) card set in the terminal, and the inactive paging restriction information can be used to indicate the condition for the network-side device to restrict paging of the SIM card when the SIM is in the inactive state.

In an embodiment, when the terminal is a multi-card terminal, a plurality of SIM cards are set in the terminal, and the inactive paging restriction information can be used to indicate the condition for the network-side device to restrict paging of at least one SIM card when the at least one SIM card is in the inactive state.

Taking a first SIM card and a second SIM card among the plurality of SIM cards as an example, the first SIM card and the second SIM card are not specific two SIM cards, but generally refer to any two different SIM cards among the plurality of SIM cards. The first SIM card and the second SIM card can belong to a same operator network or different operator networks.

The inactive paging restriction information can be used to indicate condition 1 for the network-side device to restrict paging of the first SIM card when the first SIM card is in the inactive state, and condition 2 for the network-side device to restrict paging of the second SIM card when the second SIM card is in the inactive state. Conditions 1 and 2 can be the same or different, and can be set as needed.

In an embodiment, for a multi-card terminal, when a SIM card is being used to communicate with the network-side device, the inactive paging restriction information can be sent to the network-side device through the SIM card. The inactive paging restriction information is used to indicate conditions for the network-side device to restrict paging of other (currently) unused SIM cards when these SIM cards are in the inactive state.

For example, taking the first SIM card and the second SIM card as an example, if the terminal is communicating with the network-side device using the first SIM card, the inactive paging restriction information can be sent to the network-side device through the first SIM card. The inactive paging restriction information is used to indicate a condition for the network-side device to restrict paging of the second SIM card when the second SIM card is in the inactive state.

Accordingly, when the second SIM card is in the inactive state, the network-side device can first determine whether the condition is satisfied when the network-side needs to page the second SIM card. For example, if the condition includes restricting paging for other types of service than a target type of service, the network-side device can page the second SIM card only when the network-side device needs to initiate the target type of service for the second SIM card. It is not necessary to page the second SIM card when other types of service are initiated for it.

It is to be noted that in this case, if network-side device A paging the first SIM card and network-side device B paging the second SIM card are different network-side devices, after the first SIM card sends the inactive paging restriction information to the network-side device A, the network-side device A can send the inactive paging restriction information to the network-side device B, so that the network-side device B can determine the condition for restricting the paging of the second SIM card.

Since the paging of the second SIM card by the network-side device consumes resources of the network-side device, and on the other hand, after receiving the paging for the second SIM card, the terminal needs to determine whether to interrupt communication of the first SIM card and respond to the paging for the second SIM card, which may affect the communication of the terminal.

According to the embodiment of the present disclosure, the network-side device pages the second SIM card only when initiating the target type of service for the second SIM card in the inactive state, and does not need to page the second SIM card when initiating other types of service for the second SIM card in the inactive state. This reduces the paging of the second SIM card in the communication process of the first SIM card, which is beneficial to saving network-side device resources and avoiding affecting the communication process of the terminal using the first SIM card.

In an embodiment, the network-side device communicating with the first SIM card and the network-side device paging the second SIM card can be a same network-side device or different network-side devices. For example, if the first SIM card communicates with base station A and base station B needs to page the second SIM card, base station A can forward the inactive paging restriction information from the first SIM card to base station B.

It is to be noted that the condition indicated by the inactive paging restriction information is not limited to those described in the above examples, and can be set as needed. For example, the inactive paging restriction information is used to indicate at least one of the following.

All paging is restricted. In this case, the network-side device can pause paging the terminal.

Paging for other types of service than one or more target types of service is restricted. In this case, the network-side device pages the terminal only when the target types of service are initiated, and it is not necessary to page the terminal when other types of service are initiated. The target types of service can also be set as needed, which can be one type of service or a plurality of types of service, such as voice service.

Paging for other sessions than one or more target protocol data unit (PDU) sessions is restricted. In this case, the network-side device pages the terminal only when services corresponding to the target PDU sessions are initiated, and it is not necessary to page the terminal when services corresponding to other PDU sessions are initiated.

In an embodiment, the plurality of SIM cards include a first SIM card and a second SIM card, and the method further includes: when switching from the first SIM card to the second SIM card, a second priority of the second SIM card for a service and/or a PDU session is determined; and the inactive paging restriction information is generated according to the second priority, where the inactive paging restriction information is configured to indicate that the condition for the network-side device to restrict paging of the first SIM card when the first SIM card is in an inactive state includes: restricting paging of services and/or PDU sessions corresponding to other priorities lower than the second priority.

In an embodiment, taking the first SIM card and the second SIM card as an example, if the terminal determines that it needs to switch to the second SIM card during communication using the first SIM card, a request to enter a non-connected state can be sent from the first SIM card to the network-side device. For example, a connection release request can be sent if it is requested to enter an idle state, and a suspend request can be sent when it is requested to an inactive state. When switching from the first SIM card to the second SIM card can refer to when it is determined that switching to the second SIM card is necessary, or when the first SIM card sends the request to enter the non-connected state to the network-side device.

Further, the second priority of the second priority of the ongoing or upcoming service and/or PDU session of the second SIM card can be determined. The inactive paging restriction information can be generated based on the second priority. Through the inactive paging restriction information, it is indicated that the condition for the network-side device to restrict paging of the first SIM card when the first SIM card is in the inactive state includes: restricting paging of services and/or PDU sessions corresponding to other priorities lower than the second priority.

Accordingly, when the network-side device needs to page the first SIM card in the inactive state, the network-side device can determine a relationship between the priority of paging a corresponding service and/or PDU session and the second priority. If the priority is lower than the second priority, it is not necessary to page the first SIM card in the inactive state. If the priority is higher than the second priority, the first SIM card in the inactive state can be paged. If the priority is equal to the second priority, it can be determined based on the actual situation, and can be classified as paging the first SIM card or not paging the first SIM card. Based on this, the paging of low-priority services and/or PDU sessions can be avoided from affecting the communication process of the terminal using the second SIM card, and the communication quality of the terminal using the second SIM card can be ensured.

Taking priorities of services as an example, for example, priorities are set for instant messaging service, voice call service, video communication service, and game service respectively, in descending order of voice call service, game service, instant messaging service, and video communication service.

When the terminal is currently using the first SIM card for communication, if it is determined that switching to the second SIM card is necessary, the priority of the ongoing or upcoming service of the second SIM card can be determined, such as game service. Furthermore, inactive paging restriction information can be generated based on this. The inactive paging restriction information indicates that when the network-side device pages the first SIM card in the inactive state, other services with priorities lower than the priority corresponding to the game service are restricted. For the above four services, the first SIM card in the inactive state is paged only when the network-side device triggers paging based on the voice call service. The first SIM card in the inactive state is not paged when paging is triggered based on other services. Based on this, the communication of the terminal using the second SIM card can be prevented from being affected by the paging of the low-priority services, which is beneficial to ensuring the communication quality of the terminal using the second SIM card.

In an embodiment, the plurality of SIM cards correspond to an association relationship between services and/or PDU sessions and priorities, or each of the plurality of SIM cards respectively corresponds to an association relationship between services and/or PDU sessions and priorities.

In an embodiment, the plurality of SIM cards can be set to correspond to an association relationship between services and/or PDU sessions and priorities. Taking the association relationship between services and priorities as an example, a set of association relationship between the services and the priorities can be set. When the terminal uses any SIM card for communication, the priority corresponding to the service for communication is determined based on this set of association relationship.

In an embodiment, it can be set that each SIM card respectively corresponds to an association relationship between services and/or PDU sessions and priorities. Taking the association relationship between services and priorities as an example, a plurality of sets of association relationships between the services and the priorities can be set. Each SIM card can correspond to a different association relationship. When a terminal uses a SIM card for communication, the association relationship corresponding to the SIM card can be determined first, and then a priority corresponding to a service of the SIM card for communication can be determined based on the association relationship.

For example, the first SIM card is only used for voice communication, and the association relationship between services and priorities corresponding to the first SIM card is that the priority of voice call service is higher than priorities of other services. The second SIM card is only used for game service, and the association relationship between services and priorities corresponding to the second SIM card is that the priority of the game service is higher than priorities of other services. When the terminal switches from the first SIM card to the second SIM card, the generated paging restriction information can indicate that the condition for the network-side device to restrict paging of the first SIM card in the inactive state is to restrict paging of other services than the voice call service. That is, the terminal is paged only when paging is triggered based on the voice call service.

In an embodiment, the method further includes: sending updated information of the inactive paging restriction information to the network-side device. The terminal can update the inactive paging restriction information by sending the updated information of the inactive paging restriction information to the network-side device as needed. For example, part or all of the restriction conditions indicated by the inactive paging restriction can be updated.

It is to be noted that the update includes at least one of the following operations: adding restriction conditions, deleting indicated restriction conditions, or changing indicated restriction conditions. Changing the indicated restriction conditions can be different based on different conditions. For example, if the condition is to restrict all paging, changing the indicated restriction conditions can refer to changing to restrict paging for other types of service than the target type of service. For example, if the condition is to restrict paging of services and/or PDU sessions corresponding to other priorities lower than a target priority, changing the indicated restriction condition may refer to reducing the target priority.

In an embodiment, sending the updated information of the inactive paging restriction information to the network-side device includes: sending the updated information of the inactive paging restriction information to the network-side device when satisfying at least one of: a duration of communication using the second SIM card is greater than a duration threshold; or a data amount of data transmitted using the second SIM card is greater than a data amount threshold.

In an embodiment, after switching to the second SIM card for communication, the usage of the second SIM card can be monitored, and whether to send the updated information can be determined according to a monitoring result.

For example, the duration of using the second SIM card for communication can be monitored. If the duration is greater than the duration threshold, the main content of the communication with the second SIM card may have ended in general. Therefore, the inactive paging restriction information can be appropriately updated, for example, the target priority is reduced, so that the network-side device can page the first SIM card for more services to ensure the communication of the first SIM card to a certain extent.

Similarly, the data amount of data transmitted using the second SIM card can also be monitored. If the data amount is greater than the data threshold, the main content of the communication with the second SIM card may have ended in general. Therefore, the inactive paging restriction information can be appropriately updated, for example, the target priority is reduced, so that the network-side device can page the first SIM card for more services to ensure the communication of the first SIM card to a certain extent.

It is to be noted that the above monitoring operations can be performed by the second SIM card or by a processor of the terminal. The operation of generating update information can be performed by the first SIM card or by the processor of the terminal.

In an embodiment, the network-side device includes a base station, and the inactive paging restriction information is carried in radio resource control (RRC) signaling.

When in a connected state, the terminal can send the inactive paging restriction information to the base station through RRC signaling.

In an embodiment, the inactive paging restriction information is carried in user equipment (UE) assistance information of the RRC signaling.

In an embodiment, the inactive paging restriction information is carried in a newly added information element (IE) of the UE assistance information.

In an embodiment, the UE assistance information is further configured to indicate a RRC state that the terminal expects to enter. The RRC state includes, but is not limited to, an idle state and an inactive state.

In an embodiment, for a multi-card terminal, when a SIM card is being used to communicate with the network-side device, if it is necessary to switch to other SIM cards for communication, the inactive paging restriction information can be sent to the network-side device through the SIM card being used. The inactive paging restriction information is used to indicate the condition for the network-side device to restrict paging of the SIM card being used.

In this case, since the terminal needs to switch to use other SIM cards for communication, the RRC state of the SIM card currently in use will change from the connected state to another state. Therefore, if the inactive paging restriction information is sent to the base station through the UE assistance information, the RRC state that the SIM card being used expects to enter can also be indicated through the UE assistance information. The inactive paging restriction information is carried through the UE assistance information, and the RRC state that is expected to enter can be indicated, which is beneficial to saving communication resources.

In an embodiment, the UE assistance information can indicate the RRC state that the terminal expects to enter in an explicit way. For example, it is indicated the RRC state that the terminal expects to enter by adding specific indication information to the UE assistance information. The UE assistance information can also indicate the RRC state that the terminal expects to enter in an implicit way. For example, if the UE assistance information carries the inactive paging restriction information, the UE assistance information indicates that the terminal expects to enter a target RRC state by default. The target RRC state can be the idle state or the inactive state.

In an embodiment, the network-side device includes a 5th generation mobile communication technology (5G) core network, for example, a core network in a new radio (NR) system, and the core network element is an access and mobility management function (AMF). The inactive paging restriction information is carried in at least one of the following: a service request message; or registration request signaling.

Figure 2:
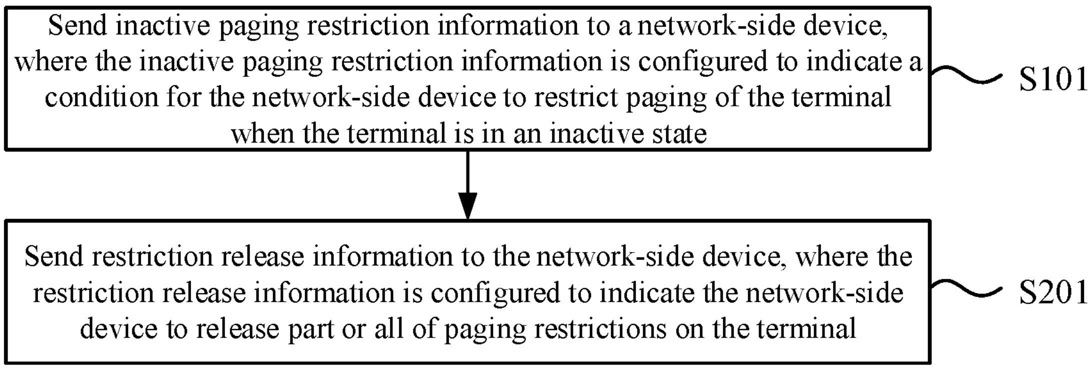
FIG. 2 is a schematic flowchart of another information sending method according to an embodiment of the present disclosure.

FIG. 2 is a schematic flowchart of another information sending method according to an embodiment of the present disclosure. As shown in FIG. 2, the method further includes step S201.

In step S201, restriction release information is sent to the network-side device, where the restriction release information is configured to indicate that the network-side device is to release part or all of the paging restrictions on the terminal.

In an embodiment, the terminal may also send the restriction release information to the network-side device to indicate that the network-side device should release part or all of the paging restrictions on the terminal, so that the network-side device can change conditions to be considered when the network-side device needs to page the terminal.

For example, if there are a plurality of conditions for restricting paging of the terminal, the restriction release information can indicate that one or more of the plurality of conditions are invalid. For example, if one of the conditions is indicated to be invalid, when the network-side device needs to page the terminal, the network-side device can determine whether to page the terminal only according to other conditions that are not invalid, regardless of the invalid condition. For example, if all conditions are indicated to be invalid, the network-side device can directly page the terminal when the network-side device needs to page the terminal. Therefore, the flexibility of paging the terminal by the network-side device can be improved, which is beneficial to meet the needs of the terminal and the network-side device.

In an embodiment, the inactive paging restriction information is further configured to indicate a duration for the network-side device to restrict the paging of the terminal.

The network-side device can restrict the paging of the terminal based on the condition indicated by the inactive paging restriction information only within this duration, and can directly page the terminal outside the duration.

For example, there are a plurality of conditions for restricting paging, and different durations can be set for each condition. For example, if the inactive paging restriction information indicates two restriction conditions, condition 1 corresponds to duration T1, condition 2 corresponds to duration T2, T1<T2, and T1 and T2 have a same starting point, so when the network-side device needs to page the terminal within the duration T1, the network-side device can determine whether one of conditions 1 and 2 is satisfied. If so, the terminal will not be paged. When the terminal needs to be paged after the end of T1 and before the end of T2, it can be determined whether the condition 2 is satisfied. If so, the terminal will not be paged. When the terminal needs to be paged the end of T2, the terminal can be directly paged. Based on this, the flexibility of paging the terminal by the network-side device can be improved, which is beneficial to meet needs of the terminal and the network-side device.

Figure 3:
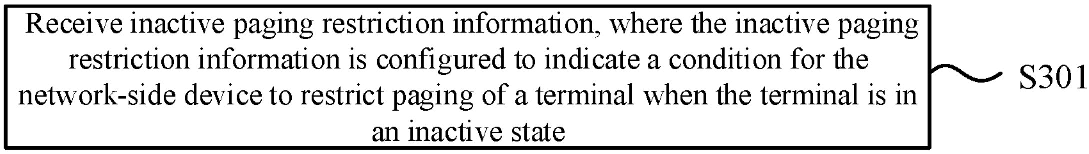
FIG. 3 is a schematic flowchart of a paging restriction method according to an embodiment of the present disclosure.

FIG. 3 is a schematic flowchart of a paging restriction method according to an embodiment of the present disclosure. The paging restriction method shown in this embodiment can be performed by a network-side device. The network-side device includes but is not limited to a base station and a core network. The base station and the core network include but are not limited to the base station and the core network in a communication system such as 4G, 5G, and 6G. The network-side device can communicate with a terminal as a user equipment (UE). The terminal includes but is not limited to a communication device such as a mobile phone, a tablet computer, a wearable device, a sensor, and an Internet of Things (IoT) device.

As shown in FIG. 3, the paging restriction method may include step S301.

In step S301, inactive paging restriction information is received, where the inactive paging restriction information is configured to indicate a condition for the network-side device to restrict paging of a terminal when the terminal is in an inactive state.

In an embodiment, the terminal can determine its own paging tendency, such as allowing reception of paging for a target type of service and not allowing reception of paging for other types of service. Further, the inactive paging restriction information can be generated based on the paging tendency, and the inactive paging restriction information can be sent to the network-side device, so that the network-side device can determine the condition for restricting paging of the terminal based on the inactive paging restriction information. When the terminal needs to be paged, it can be determined whether to page the terminal according to the condition. For example, based on the example shown in FIG. 3, the method can further include: restricting the paging of the terminal when the terminal is in the inactive state according to the condition. Therefore, unnecessary paging is avoided, so as to avoid wasting resources of the network-side device and avoid the influence on terminal communication.

In an embodiment, the terminal can be a single-card terminal or a multi-card terminal.

When the terminal is a single-card terminal, there is a subscriber identity module (SIM) card set in the terminal, and the inactive paging restriction information can be used to indicate the condition for the network-side device to restrict paging of the SIM card.

When the terminal is a multi-card terminal, a plurality of SIM cards are set in the terminal, and the inactive paging restriction information can be used to indicate the condition for the network-side device to restrict paging of at least one SIM card of the plurality of SIM cards. For example, the inactive paging restriction information can be used to indicate the condition for the network-side device to restrict paging of each SIM card.

Taking a first SIM card and a second SIM card among the plurality of SIM cards as an example, the inactive paging restriction information can be used to indicate condition 1 for the network-side device to restrict paging of the first SIM card, and condition 2 for the network-side device to restrict paging of the second SIM card. Conditions 1 and 2 can be the same or different, and can be set as needed.

In an embodiment, for a multi-card terminal, when a SIM card is being used to communicate with the network-side device, the inactive paging restriction information can be sent to the network-side device through the SIM card. The inactive paging restriction information is used to indicate conditions for the network-side device to restrict paging of other unused SIM cards.

For example, taking the first SIM card and the second SIM card as an example, if the terminal is communicating with the network-side device using the first SIM card, the inactive paging restriction information can be sent to the network-side device through the first SIM card. The inactive paging restriction information is used to indicate a condition for the network-side device to restrict paging of the second SIM card.

Accordingly, when the network-side device can first determine whether the condition is satisfied when the network-side needs to page the second SIM card. For example, if the condition includes restricting paging for other types of service than a target type of service, the network-side device can page the second SIM card only when the network-side device needs to initiate the target type of service for the second SIM card. It is not necessary to page the second SIM card when other types of service are initiated for the second SIM card.

Since the paging of the second SIM card by the network-side device consumes resources of the network-side device, and on the other hand, after receiving the paging for the second SIM card, the terminal needs to determine whether to interrupt communication of the first SIM card and respond to the paging for the second SIM card, which may affect the communication of the terminal.

According to the embodiment of the present disclosure, the network-side device pages the second SIM card only when initiating the target type of service for the second SIM card, and does not need to page the second SIM card when initiating other types of service for the second SIM card. This reduces the paging of the second SIM card in the communication process of the first SIM card, which is beneficial to saving network-side device resources and avoiding affecting the communication process of the terminal using the first SIM card.

In an embodiment, the network-side device communicating with the first SIM card and the network-side device paging the second SIM card can be a same network-side device or different network-side devices. For example, if the first SIM card communicates with base station A and base station B needs to page the second SIM card, base station A can forward the inactive paging restriction information from the first SIM card to base station B.

It is to be noted that the condition indicated by the inactive paging restriction information is not limited to those described in the above examples, and can be set as needed. For example, the inactive paging restriction information is used to indicate at least one of the following.

All paging is restricted. In this case, the network-side device can pause paging the terminal.

Paging for other types of service than one or more target types of service is restricted. In this case, the network-side device pages the terminal only when the target types of service are initiated, and it is not necessary to page the terminal when other types of service are initiated.

Paging for other sessions than one or more target protocol data unit (PDU) sessions is restricted. In this case, the network-side device pages the terminal only when services corresponding to the target PDU sessions are initiated, and it is not necessary to page the terminal when services corresponding to other PDU sessions are initiated.

Paging of services and/or PDU sessions corresponding to other priorities lower than a target priority is restricted. In this case, when initiating paging, the network-side device can first determine a priority of paging a corresponding service and/or PDU session. Only when the priority is higher than the target priority can the network-side device page the terminal. When the priority is lower than the target priority, the network-side device will not page the terminal. When the priority is equal to the target priority, further determination can be made based on the actual situation.

In an embodiment, the plurality of SIM cards includes a first SIM card and a second SIM card, and the method further includes: when switching from the first SIM card to the second SIM card, a second priority of the second SIM card for a service and/or a PDU session is determined; and the inactive paging restriction information is generated according to the second priority, where the inactive paging restriction information is configured to indicate that the condition for the network-side device to restrict paging of the first SIM card when the first SIM card is in an inactive state includes: restricting paging of services and/or PDU sessions corresponding to other priorities lower than the second priority.

In an embodiment, taking the first SIM card and the second SIM card as an example, if the terminal determines that it needs to switch to the second SIM card during communication using the first SIM card, a request to enter a non-connected state can be sent from the first SIM card to the network-side device. For example, a connection release request can be sent if it is requested to enter an idle state, and a suspend request can be sent when it is requested to an inactive state. When switching from the first SIM card to the second SIM card can refer to when it is determined that switching to the second SIM card is necessary, or when the first SIM card sends the request to enter the non-connected state to the network-side device.

Further, the second priority of the second priority of the ongoing or upcoming service and/or PDU session of the second SIM card can be determined. The inactive paging restriction information can be generated based on the second priority. Through the inactive paging restriction information, it is indicated that the condition for the network-side device to restrict paging of the first SIM card when the first SIM card is in the inactive state includes: restricting paging of services and/or PDU sessions corresponding to other priorities lower than the second priority.

Accordingly, when the network-side device needs to page the first SIM card in the inactive state, the network-side device can determine a relationship between the priority of paging a corresponding service and/or PDU session and the second priority. If the priority is lower than the second priority, it is not necessary to page the first SIM card in the inactive state. If the priority is higher than the second priority, the first SIM card in the inactive state can be paged. If the priority is equal to the second priority, it can be determined based on the actual situation, and can be classified as paging the first SIM card or not paging the first SIM card. Based on this, the paging of low-priority services and/or PDU sessions can be avoided from affecting the communication process of the terminal using the second SIM card, and the communication quality of the terminal using the second SIM card can be ensured.

Taking priorities of services as an example, for example, priorities are set for instant messaging service, voice call service, video communication service, and game service respectively, in descending order of voice call service, game service, instant messaging service, and video communication service.

When the terminal is currently using the first SIM card for communication, if it is determined that switching to the second SIM card is necessary, the priority of the ongoing or upcoming service of the second SIM card can be determined, such as game service. Furthermore, inactive paging restriction information can be generated based on this. The inactive paging restriction information indicates that when the network-side device pages the first SIM card in the inactive state, other services with priorities lower than the priority corresponding to the game service are restricted. For the above four services, the first SIM card in the inactive state is paged only when the network-side device triggers paging based on the voice call service. The first SIM card in the inactive state is not paged when paging is triggered based on other services. Based on this, the communication of the terminal using the second SIM card can be prevented from being affected by the paging of the low-priority services, which is beneficial to ensuring the communication quality of the terminal using the second SIM card.

In an embodiment, the network-side device includes a base station, and receiving the inactive paging restriction information includes: receiving the inactive paging restriction information from a core network and/or the terminal.

The base station can receive the inactive paging restriction information from the terminal. For example, the terminal can carry the inactive paging restriction information in radio resource control (RRC) signaling to send to the base station, for example, the inactive paging restriction information can be carried in user equipment (UE) assistance information of the RRC signaling to send to the base station.

The base station can also receive the inactive paging restriction information from the core network. In this case, the terminal can send the inactive paging restriction information to the core network in a transparent transmission manner by a base station. For example, the terminal can carry the inactive paging restriction information in a service request message or registration request signaling to send the inactive paging restriction information to the core network. Furthermore, the core network sends the inactive paging restriction information to the base station. For example, the inactive paging restriction information is carried in RRC inactive assistance information and sent to the base station. For example, the inactive paging restriction information is carried in a mobility restriction list information unit and sent to the base station.

Figure 4:
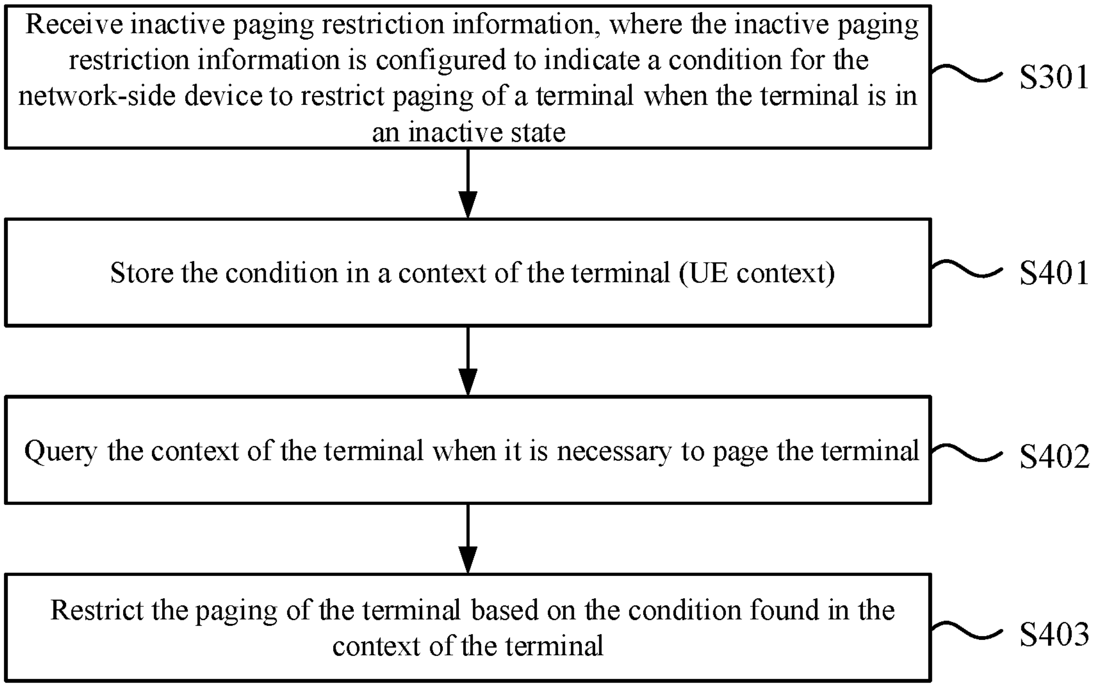
FIG. 4 is a schematic flowchart of another paging restriction method according to an embodiment of the present disclosure.

FIG. 4 is a schematic flowchart of another paging restriction method according to an embodiment of the present disclosure. As shown in FIG. 4, the network-side device includes a base station, and restricting the paging of the terminal when the terminal is in the inactive state according to the condition includes steps S401 to S403.

In step S401, the condition is stored in a context of the terminal (UE context).

In step S402, the context of the terminal is queried when it is necessary to page the terminal.

In step S403, the paging of the terminal is restricted based on the condition found in the context of the terminal.

In an embodiment, the base station will query the context of the terminal when the base station needs to initiate paging for the terminal. On this basis, the restriction condition indicated by the inactive paging restriction information is stored in the context of the terminal, which can ensure that the base station can query for the restriction condition during the process of querying the context when the terminal is in the inactive state and needs to be paged. If the restriction condition is found, it can be determined whether to page the terminal based on the restriction condition, which is beneficial for quickly determining the restriction condition. If the restriction condition is not found, the terminal can be directly paged.

In an embodiment, the base station receives the inactive paging restriction information from the terminal, and the method further includes: sending the inactive paging restriction information to a core network after indicating the terminal to enter the inactive state.

When the terminal is in a connected state, the terminal can send the inactive paging restriction information to the base station. After indicating the terminal to enter the inactive state, the base station can send the inactive paging restriction information to the core network through a next generation (NG) interface between the base station and the core network. For example, the inactive paging restriction information can be carried through NG application protocol (NGAP) signaling and sent to the core network. For example, the inactive paging restriction information can be carried through RRC INACTIVE TRANSITION REPORT signaling and sent to the core network.

In an embodiment, in a case where the network-side device is a core network and the core network receives the inactive paging restriction information from the base station, the method further includes: configuration information is sent to the base station, where the configuration information is configured to configure the base station to send the inactive paging restriction information to the core network after indicating the terminal to enter the inactive state.

In order to ensure that the base station can send the inactive paging restriction information to the core network after indicating the terminal to enter the inactive state, the core network can send the configuration information to the base station in advance to configure the base station to send the inactive paging restriction information to the core network after indicating the terminal to enter the inactive state.

In an embodiment, configuration information can be carried in an information unit of RRC INACTIVE TRANSATION REPORT REQUEST signaling and sent to the base station.

In an embodiment, the network-side device includes a base station, and the method further includes: sending the inactive paging restriction information to other base stations in a radio access network (RAN) notification area (RNA) where the terminal is located.

When the base station indicates the terminal to enter the inactive state, this base station is an anchor base station in the RNA. However, when the terminal is in the inactive state, since the terminal can move within the RNA, the terminal may no longer be within the coverage range of the anchor base station when the terminal is paged. Therefore, other base stations within the RNA need to page the terminal together. Therefore, the anchor base station can send the inactive paging restriction information to other base stations, for example, through newly introduced NGAP signaling, so that other base stations can determine the restriction condition for paging the terminal based on the inactive paging restriction information when paging the terminal in the inactive state.

In an embodiment, the network-side device includes a base station, and the method further includes: receiving data sent by a core network to the terminal in the inactive state; and paging the terminal when the data includes data that is not restricted by the condition.

When the terminal is in the inactive state, from the perspective of the core network, the terminal does not leave the connected state. Therefore, when data needs to be sent to the terminal, the core network will not directly page the terminal, but will send the data to the anchor base station, which can further send the data to other base stations in the RNA.

After receiving the data sent by the core network to the terminal, base stations (such as the anchor base station and other base stations in RNA) can first determine whether the data to be sent to the terminal includes data that is not restricted by the condition. If the data does not include data that is not restricted by the condition, that is, all data is restricted by the condition, it is not necessary to page the terminal. If the data includes data that is not restricted by the condition, for example, all data is not restricted by the condition, or part of data is not restricted by the condition, the terminal can be paged. So that the terminal can enter a connected state, and the data that is not restricted by the conditions can be transmitted to the terminal.

In the above embodiments, the base station determines whether to page the terminal based on the restriction condition. The following embodiments mainly describe whether the core network sends data to the base station based on the restriction condition.

In an embodiment, the network-side device includes a core network, and the method further includes: when it is necessary to send data to the terminal in the inactive state, determining whether the data includes data that is not restricted by the condition; and when the data includes the data that is not restricted by the condition, sending the data to an anchor base station of the terminal.

When the terminal is in the inactive state, from the perspective of the core network, the terminal does not leave the connected state. Therefore, when data needs to be sent to the terminal, the core network will not directly page the terminal, but will send the data to the anchor base station, which can further send the data to other base stations in the RNA.

When the core network needs to send data to the terminal, the core network can first determine whether the data to be sent to the terminal includes data that is not restricted by the condition. If the data does not include data that is not restricted by the condition, that is, all data is restricted by the condition, it is not necessary to send the data to the anchor base station. The anchor base station will not page the terminal. If the data includes data that is not restricted by the condition, for example, all data is not restricted by the condition, or part of data is not restricted by the condition, the data can be sent to the anchor base station. The anchor base station and other base stations within the RNA can page the terminal. So that the terminal can enter a connected state, and the data that is not restricted by the conditions can be transmitted to the terminal.

In an embodiment, the network-side device includes the core network, and receiving the inactive paging restriction information includes: receiving the inactive paging restriction information from a base station and/or the terminal.

The core network can receive the inactive paging restriction information from the terminal. In this case, the terminal can send the inactive paging restriction information to the core network in a transparent transmission manner by a base station. For example, the terminal can carry the inactive paging restriction information in a service request message or registration request signaling to send the inactive paging restriction information to the core network.

The core network can also receive the inactive paging restriction information from the base station. For example, the terminal can first send the inactive paging restriction information to the base station, which then sends the inactive paging restriction information to the core network. For example, the base station can carry the inactive paging restriction information in RRC INACTIVE TRANSATION REPORT REQUEST signaling to send the inactive paging restriction information to the core network. In this case, the base station transmits the inactive paging restriction information in a non-transparent transmission manner.

In an embodiment, transparent transmission of the inactive paging restriction information by the base station can refer to that after receiving the inactive paging restriction information, the base station directly transmits the inactive paging restriction information to the core network without decoding, storing, or other processing. Non-transparent transmission of the inactive paging restriction information by the base station can refer to that after receiving the inactive paging restriction information, the base station can perform processing such as decoding, storing on the inactive paging restriction information, and then repackage and transmit the inactive paging restriction information to the core network.

That is, the inactive paging restriction information can be sent by the terminal to the base station, and sent by the base station to the core network. Or, the inactive paging restriction information can be sent to the core network by the terminal.

In an embodiment, when the inactive paging restriction information is sent from the terminal to the core network, the inactive paging restriction information is carried in at least one of the following: a service request message; or registration request signaling.

In an embodiment, in the case where the inactive paging restriction information is sent from the terminal to the core network, restricting the paging of the terminal when the terminal is in the inactive state according to the condition includes: sending the inactive paging restriction information to one or more base stations, and indicating the base stations to restrict the paging of the terminal according to the condition in the inactive paging restriction information. The terminal can first send the inactive paging restriction information to the core network, and then the core network sends the inactive paging restriction information to the base stations.

In an embodiment, the base station includes at least one of: base stations in a radio access network (RAN) notification area (RNA) where the terminal is located; or one or more base stations connected to the terminal.

After receiving the inactive paging restriction information sent by the terminal, the core network can determine base stations in the RNA where the terminal is located, including an anchor base station and other base stations, and send the inactive paging restriction information to the base stations in the RNA. The core network can also determine the base stations to which the terminal is connected and send the inactive paging restriction information to the base stations to which the terminal is connected.

The specific base stations to which the inactive paging restriction information is sent can be determined by the core network as needed, or by the indication of the terminal. For example, in the inactive paging restriction information, it is indicated which base stations the core network needs to send the inactive paging restriction information to.

In an embodiment, the core network carries the inactive paging restriction information in the RRC inactive assistance information and sends it to the base stations connected to the terminal. For example, the inactive paging restriction information is carried in core network assistance information for RRC INACTIVE. In an embodiment, the core network carries the inactive paging restriction information in a mobility restriction list information unit and sends it to the base stations in the RNA where the terminal is located.

Figures 5, 6:
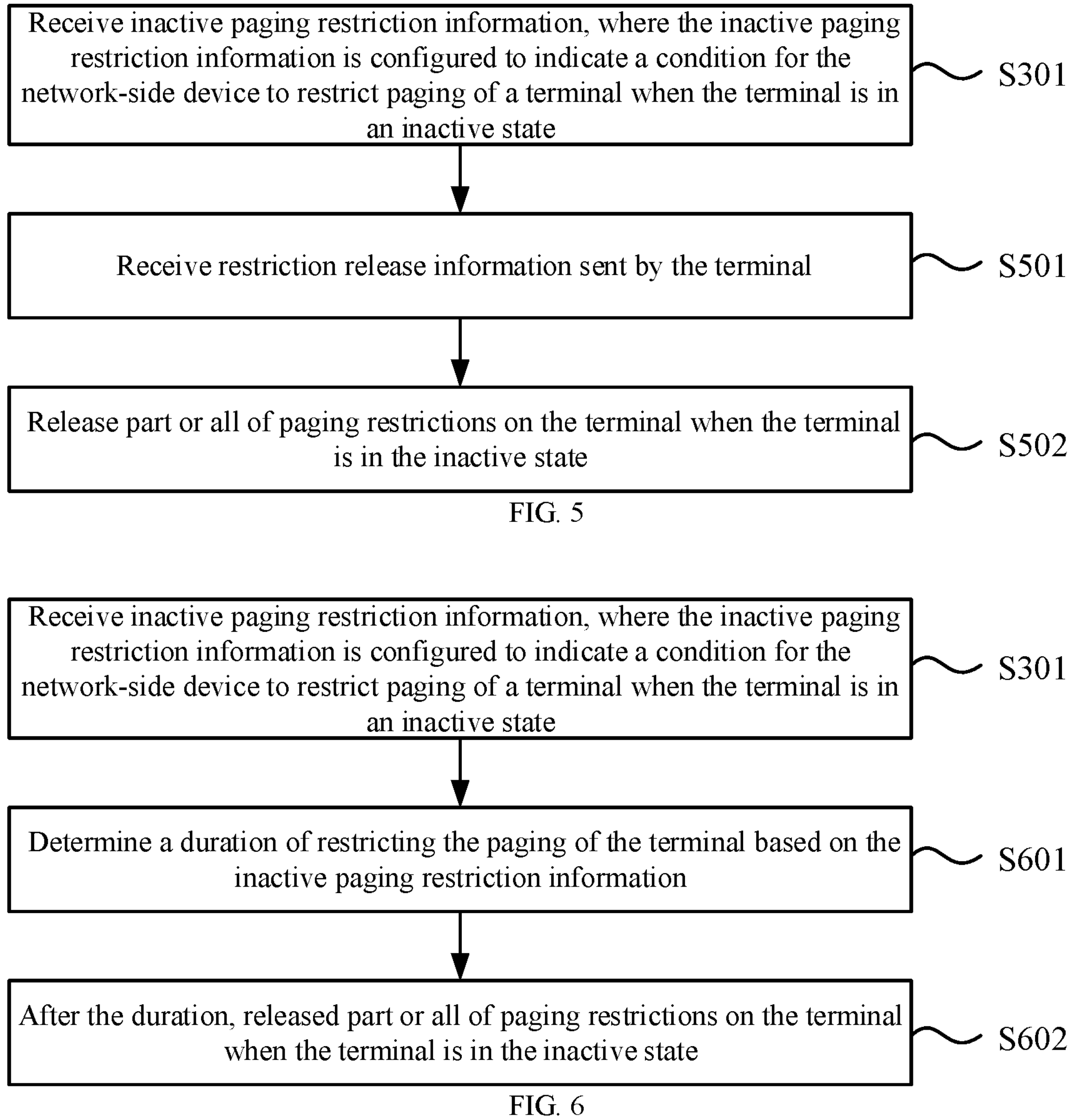
FIG. 5 is a schematic flowchart of yet another paging restriction method according to an embodiment of the present disclosure.
FIG. 6 is a schematic flowchart of yet another paging restriction method according to an embodiment of the present disclosure.

FIG. 5 is a schematic flowchart of another paging restriction method according to an embodiment of the present application. The paging restriction method is used for a network-side device. As shown in FIG. 5, the method further includes steps S501 and S502.

In step S501, restriction release information sent by the terminal is received.

In step S502, part or all of the paging restrictions on the terminal when the terminal is in the inactive state are released.

In an embodiment, the terminal can also send the restriction release information to the network-side device to indicate that the network-side device should release part or all of the paging restrictions on the terminal when the terminal is in the inactive state, so that the network-side device can change the conditions to be considered when the network-side device needs to page the terminal.

For example, if there are a plurality of conditions for restricting paging of the terminal, the restriction release information can indicate that one or more of the plurality of conditions are invalid. For example, if one of the conditions is indicated to be invalid, when the network-side device needs to page the terminal in the inactive state, network-side device can determine whether to page the terminal only according to other conditions that are not invalid, regardless of the invalid condition. For example, if all conditions are indicated to be invalid, the network-side device can directly page the terminal when the network-side device needs to page the terminal in the inactive state. Therefore, the flexibility of paging the terminal by the network-side device can be improved, which is beneficial to meet the needs of the terminal and the network-side device.

FIG. 6 is a schematic flowchart of another paging restriction method according to an embodiment of the present application. The paging restriction method is used for a network-side device. As shown in FIG. 6, the method further includes steps S601 and S602.

In step S601, a duration of restricting the paging of the terminal is determined based on the inactive paging restriction information.

In step S602, after the duration, part or all of the paging restrictions on the terminal when the terminal is in the inactive state are released.

In an embodiment, the inactive paging restriction information is further configured to indicate a duration for the network-side device to restrict the paging of the terminal.

The network-side device can restrict the paging of the terminal in the inactive state based on the condition indicated by the inactive paging restriction information, only within this duration, and can directly page the terminal in the inactive state outside the duration.

For example, there are a plurality of conditions for restricting paging, and different durations can be set for each condition. For example, if the inactive paging restriction information indicates two restriction conditions, condition 1 corresponds to duration T1, condition 2 corresponds to duration T2, T1<T2, and T1 and T2 have a same starting point, so when the network-side device needs to page the terminal within the duration T1, the network-side device can determine whether one of conditions 1 and 2, is satisfied. If so, the terminal will not be paged. When the terminal needs to be paged after the end of T1 and before the end of T2, it can be determined whether condition 2 is satisfied. If so, the terminal will not be paged. When the terminal needs to be paged after the end of T2, the terminal can be directly paged. Based on this, the flexibility of paging the terminal by the network-side device can be improved, which is beneficial to meet the needs of the terminal and the network-side device.

Corresponding to the aforementioned embodiments of the information sending method and the paging restriction, the present disclosure also provides embodiments of an information sending apparatus and a paging restriction apparatus.

An embodiment of the present disclosure also proposes an information sending apparatus, which can be applicable to a terminal. The terminal includes but is not limited to a communication device such as a mobile phone, a tablet computer, a wearable device, a sensor, and an Internet of Things (IoT) device. The terminal can communicate with a network-side device as a user equipment (UE). The network-side device includes, but is not limited to, a base station and a core network. The base station and the core network include but are not limited to the base station and the core network in a communication system such as 4G, 5G, and 6G.

In an embodiment, the apparatus includes one or more processors configured to send inactive paging restriction information to the network-side device, where the inactive paging restriction information is configured to indicate a condition for the network-side device to restrict paging of the terminal when the terminal is in an inactive state.

In an embodiment, the inactive paging restriction information is configured to indicate at least one of: restricting all paging; restricting paging for other types of service than one or more target types of service; restricting paging for other sessions than one or more target protocol data unit (PDU) sessions; or restricting paging for services and/or PDU sessions corresponding to other priorities lower than a target priority.

In an embodiment, a plurality of subscriber identity module (SIM) cards are provided in the terminal, and the inactive paging restriction information is configured to indicate a condition for the network-side device to restrict paging of at least one of the plurality of SIM cards when the at least one of the plurality of SIM cards is in an inactive state.

In an embodiment, the plurality of SIM cards includes a first SIM card and a second SIM card, and the processors are further configured: when switching from the first SIM card to the second SIM card, determine a second priority of the second SIM card for a service and/or a protocol data unit (PDU) session; and generate the inactive paging restriction information according to the second priority, where the inactive paging restriction information is configured to indicate that a condition for the network-side device to restrict paging of the first SIM card when the first SIM card is in an inactive state includes: restricting paging of services and/or PDU sessions corresponding to other priorities lower than the second priority.

In an embodiment, the plurality of SIM cards correspond to an association relationship between services and/or PDU sessions and priorities, or each of the plurality of SIM cards respectively corresponds to an association relationship between services and/or PDU sessions and priorities.

In an embodiment, the processors are further configured to send updated information of the inactive paging restriction information to the network-side device.

In an embodiment, the processors are further configured to send the updated information of the inactive paging restriction information to the network-side device when satisfying at least one of: a duration of communication using the second SIM card is greater than a duration threshold; or a data amount of data transmitted using the second SIM card is greater than a data amount threshold.

In an embodiment, the network-side device includes at least one of: a base station; or a core network.

In an embodiment, the network-side device includes the base station, and the inactive paging restriction information is carried in radio resource control (RRC) signaling.

In an embodiment, the inactive paging restriction information is carried in user equipment (UE) assistance information of the RRC signaling.

In an embodiment, the inactive paging restriction information is carried in a newly added information element (IE) of the UE assistance information.

In an embodiment, the UE assistance information is further configured to indicate a RRC state that the terminal expects to enter.

In an embodiment, the UE assistance information indicates the RRC state that the terminal expects to enter in an explicit manner and/or an implicit manner.

In an embodiment, the network-side device includes a 5th generation mobile communication technology (5G) core network, and the inactive paging restriction information is carried in at least one of: a service request message; or registration request signaling.

In an embodiment, the processors are further configured to send restriction release information to the network-side device, where the restriction release information is configured to indicate to the network-side device to release part or all of paging restrictions on the terminal when the terminal is in the inactive state.

In an embodiment, the inactive paging restriction information is further configured to indicate a duration for the network-side device to restrict the paging of the terminal when the terminal is in the inactive state.

An embodiment of the present disclosure also proposes a paging restriction apparatus, which can be applicable to a network-side device. The network-side device includes, but is not limited to, a base station and a core network. The base station and the core network include but are not limited to the base station and the core network in a communication system such as 4G, 5G, and 6G. The network-side device can communicate with a terminal as a user equipment (UE). The terminal includes but is not limited to a communication device such as a mobile phone, a tablet computer, a wearable device, a sensor, and an Internet of Things (IoT) device.

In an embodiment, the apparatus includes one or more processors configured to receive inactive paging restriction information, where the inactive paging restriction information is configured to indicate a condition for a network-side device to restrict paging of a terminal when the terminal is in an inactive state.

In an embodiment, the processors are further configured to restrict the paging of the terminal when the terminal is in the inactive state according to the condition.

In an embodiment, the network-side device includes at least one of: a base station; or a core network.

In an embodiment, the network-side device includes the base station, and receiving the inactive paging restriction information includes: receiving the inactive paging restriction information from a core network and/or the terminal.

In an embodiment, the network-side device includes the base station, and the processors are further configured to: store the condition in a context of the terminal; query the context of the terminal when the terminal needs to be paged; and restrict the paging of the terminal based on the condition found in the context of the terminal.

In an embodiment, the base station receives the inactive paging restriction information from the terminal, and the processors are further configured to: send the inactive paging restriction information to a core network after indicating the terminal to enter the inactive state.

In an embodiment, the network-side device includes the base station, and the processors are further configured to: send the inactive paging restriction information to other base stations in a radio access network (RAN) notification area (RNA) where the terminal is located.

In an embodiment, the network-side device includes the base station, and the processors are further configured to: receive data sent by a core network to the terminal in the inactive state; and page the terminal when the data includes data that is not restricted by the condition.

In an embodiment, the network-side device includes the core network, and receiving the inactive paging restriction information includes: receiving the inactive paging restriction information from a base station and/or the terminal.

In an embodiment, the core network receives the inactive paging restriction information from the base station, and the processors are further configured to: send configuration information to the base station, where the configuration information is configured to configure the base station to send the inactive paging restriction information to the core network after indicating the terminal to enter the inactive state.

In an embodiment, the core network receives the inactive paging restriction information from the terminal, and the inactive paging restriction information is carried in at least one of: a service request message; or registration request signaling.

In an embodiment, the network-side device includes the core network, and the processors are further configured to: send the inactive paging restriction information to one or more base stations, and indicate the one or more base stations to restrict the paging of the terminal according to the condition in the inactive paging restriction information.

In an embodiment, the one or more base stations include at least one of: base stations in a radio access network (RAN) notification area (RNA) where the terminal is located; or one or more base stations connected to the terminal.

In an embodiment, the inactive paging restriction information is carried in radio resource control (RRC) inactive assistance information and sent to the one or more base stations connected to the terminal; and/or the inactive paging restriction information is carried in a mobility restriction list information unit and sent to the base stations in the RNA where the terminal is located.

In an embodiment, the network-side device includes the core network, and the processors are further configured to: when data needs to be sent to the terminal in the inactive state, determine whether the data includes data that is not restricted by the condition; and when the data includes the data that is not restricted by the condition, send the data to an anchor base station of the terminal.

In an embodiment, the processors are further configured to: receive restriction release information sent by the terminal; and release part or all of paging restrictions on the terminal when the terminal is in the inactive state.

In an embodiment, the processors are further configured to: determine a duration of restricting the paging of the terminal based on the inactive paging restriction information; and after the duration, release part or all of the paging restrictions on the terminal when the terminal is in the inactive state.

With regard to the apparatuses in the above embodiments, the specific ways in which each module performs operations have been described in detail in the relevant method embodiments, and will not be elaborated herein.

For the apparatus embodiments, since they basically correspond to the method embodiments, please refer to the description of the method embodiments for relevant information. The apparatus embodiments described above are only illustrative, where the modules described as separate components may or may not be physically separated, and the components shown as modules may or may not be physical modules, that is, they can be located in one place or distributed to a plurality of network modules. Part or all of the modules can be selected according to actual needs to achieve the purpose of the embodiments. Ordinary technical personnel in this field can understand and implement them without creative labor.

An embodiment of the present disclosure also proposes a communication apparatus, including: a processor; and a memory used to store a computer program. When the computer program is executed by the processor, the information sending method described in any of the above embodiments is implemented.

An embodiment of the present disclosure also proposes a communication apparatus, including: a processor; and a memory used to store a computer program. When the computer program is executed by the processor, the paging restriction method described in any of the above embodiments is implemented.

An embodiment of the present disclosure also proposes a computer readable storage medium for storing a computer program. When the computer program is executed by a processor, the steps of the information sending method described in any of the above embodiments are implemented.

An embodiment of the present disclosure also proposes a computer readable storage medium for storing a computer program. When the computer program is executed by a processor, the steps of the paging restriction method described in any of the above embodiments are implemented.

According to the embodiments of the present disclosure, the terminal can send THE inactive paging restriction information to the network-side device, so that the network-side device can determine the condition for restricting paging of the terminal in the inactive state based on the inactive paging restriction information. Therefore, when it is necessary to page the terminal in the inactive state, it can be determined whether to page the terminal based on the condition, thereby avoiding unnecessary paging and waste of resources of the network-side device, and avoiding the influence on terminal communication.

In addition, for a multi-card terminal, the network-side device can page a second SIM card only when initiating a target type of service for the second SIM card in the activate state, and do not need to page the second SIM card when initiating other types of services for the second SIM card in the activate state. This reduces the paging of the second SIM card in the communication process of the first SIM card, which is beneficial to saving network-side device resources and avoiding affecting the communication process of the terminal using the first SIM card.

Figure 7:
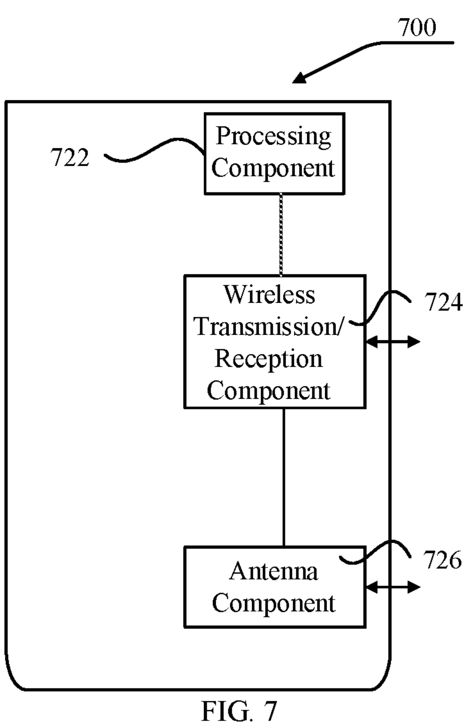
FIG. 7 is a schematic block diagram of an apparatus for sending information according to an embodiment of the present disclosure.

As shown in FIG. 7, FIG. 7 is a schematic block diagram of an apparatus 700 for restricting paging according to an embodiment of the present disclosure. The apparatus 700 can be provided as a base station. Referring to FIG. 7, the apparatus 700 includes a processing component 722, a wireless transmission/reception component 724, an antenna component 726, and a signal processing portion unique to a wireless interface. The processing component 722 can further include one or more processors. One of the processors in processing component 722 can be configured to implement the paging restriction method described in any of the above embodiments.

Figure 8:
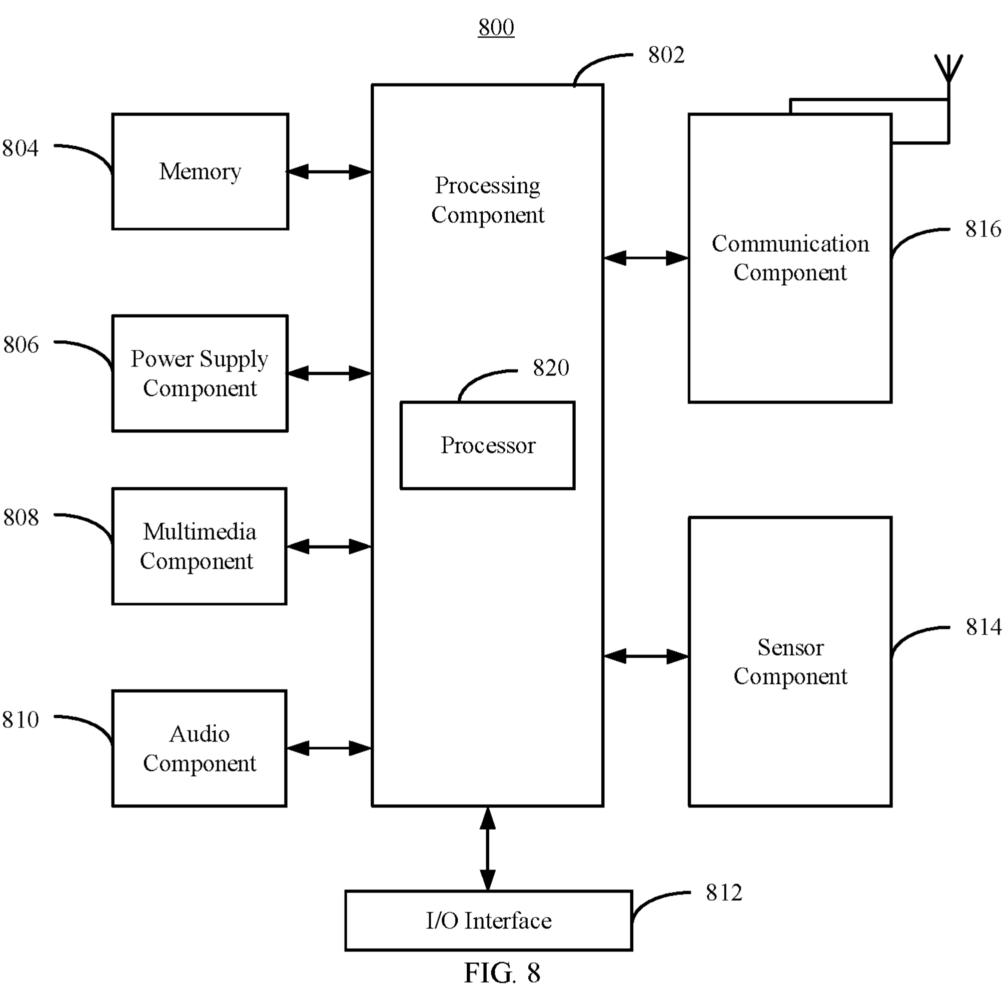
FIG. 8 is a schematic block diagram of an apparatus for restricting paging according to an embodiment of the present disclosure.

FIG. 8 is a schematic block diagram of an apparatus 800 for information transmission shown in accordance with the embodiments disclosed herein. For example, apparatus 800 can be a mobile phone, computer, digital broadcasting terminal, messaging device, game console, tablet device, medical device, fitness device, personal digital assistant, etc.

By referring to FIG. 8, an apparatus 800 may include one or more of the following components: a processing component 802, a memory 804, a power supply component 806, a multimedia component 808, an audio component 810, an input/output (I/O) interface 812, a sensor component 814, and a communication component 816.

The processing component 802 generally controls the overall operations of the apparatus 800, such as operations associated with display, phone calls, data communications, camera operations, and recording operations. The processing component 802 may include one or more processors 820 to execute instructions to complete all or a part of the steps of the above information sending method. In addition, the processing component 802 may include one or more modules which facilitate the interaction between the processing component 802 and other components. For example, the processing component 802 may include a multimedia module to facilitate the interaction between the multimedia component 808 and the processing component 802.

The memory 804 is configured to store various types of data to support the operations of the apparatus 800. Examples of such data include instructions for any application or method operated on the apparatus 800, contact data, phonebook data, messages, pictures, videos, and the like. The memory 804 may be implemented by any type of volatile or non-volatile storage device or a combination thereof, such as a static random access memory (SRAM), an electrically erasable programmable read-only memory (EEPROM), an erasable and programmable read-only memory (EPROM), a programmable read-only memory (PROM), a read-only memory (ROM), a magnetic memory, a flash memory, a magnetic disk or an optical disk.

The power supply component 806 provides power for various components of the apparatus 800. The power supply component 806 may include a power management system, one or more power supplies, and other components associated with generating, managing, and distributing power for the apparatus 800.

The multimedia component 808 includes a screen providing an output interface between the apparatus 800 and a user. In some examples, the screen may include a liquid crystal display (LCD) and a touch panel (TP). If the screen includes the TP, the screen may be implemented as a touch screen to receive input signals from the user. The TP may include one or more touch sensors to sense touches, swipes, and gestures on the TP. The touch sensor may not only sense a boundary of a touch or swipe, but also sense a lasting time and a pressure associated with the touch or swipe. In some examples, the multimedia component 808 includes a front camera and/or a rear camera. The front camera and/or rear camera may receive external multimedia data when the apparatus 800 is in an operating mode, such as a photographing mode or a video mode. Each front camera and rear camera may be a fixed optical lens system or have focal length and optical zooming capability.

The audio component 810 is configured to output and/or input an audio signal. For example, the audio component 810 includes a microphone (MIC) that is configured to receive an external audio signal when the apparatus 800 is in an operating mode, such as a call mode, a recording mode, and a voice recognition mode. The received audio signal may be further stored in memory 804 or transmitted via communication component 816. In some examples, the audio component 810 also includes a speaker for outputting an audio signal.

The I/O interface 812 provides an interface between the processing component 802 and a peripheral interface module. The above peripheral interface module may be a keyboard, a click wheel, buttons, or the like. These buttons may include but are not limited to, a home button, a volume button, a start button, and a lock button.

The sensor component 814 includes one or more sensors to provide the apparatus 800 with status assessments in various aspects. For example, the sensor component 814 may detect an open/closed state of the apparatus 800 and a relative positioning of components such as a display and a keypad of the apparatus 800. The sensor component 814 may also detect a change in position of the apparatus 800 or a component of the apparatus 800, the presence or absence of user contact with the apparatus 800, orientation or acceleration/deceleration of the apparatus 800, and temperature change of the apparatus 800. The sensor component 814 may include a proximity sensor configured to detect the presence of a nearby object without any physical contact. The sensor component 814 may further include an optical sensor, such as a complementary metal-oxide-semiconductor (CMOS) or charged coupled device (CCD) image sensor, which is used in imaging applications. In some examples, the sensor component 814 may also include an acceleration sensor, a gyro sensor, a magnetic sensor, a pressure sensor, or a temperature sensor.

The communication component 816 is configured to facilitate wired or wireless communication between the apparatus 800 and other devices. The apparatus 800 may access a wireless network based on a communication standard, such as WiFi, 2G or 3G, 4G LTE, 5G NR, or a combination thereof. In an example, the communication component 816 receives broadcast signals or broadcast related information from an external broadcast management system via a broadcast channel. In an example, the communication component 816 also includes a near field communication (NFC) module to facilitate short-range communication. For example, the NFC module may be implemented based on a radio frequency identification (RFID) technology, an infrared data association (IrDA) technology, an ultra-wideband (UWB) technology, a Bluetooth® (BT) technology, and other technologies.

In one or more examples, the apparatus 800 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic components for performing the above information sending method.

In exemplary embodiments, there is also provided a non-transitory computer readable storage medium including instructions, such as the memory 804 including instructions, which are executable by the processors 820 in the apparatus 800 for performing the above information sending method. For example, the non-transitory computer readable storage medium may be a ROM, a RAM, a CD-ROM, a magnetic tape, a floppy disc, an optical data storage device, and the like.

Those skilled in the art easily think of other embodiments of the present disclosure after considering the description and practicing the present disclosure disclosed herein. The present disclosure is intended to cover any variations, uses, or adaptive changes that follow the general principles of the present disclosure and include common general knowledge or customary technical means in the technical field not disclosed in the present disclosure. The description and examples are to be considered exemplary only, and the true scope and spirit of the present disclosure are disclosed by the claims.

It should be understood that the present disclosure is not limited to the precise structure that has been described above and shown in the accompanying drawings, and various modifications and changes can be made without departing from the scope thereof. The scope of the present disclosure is limited only by the appended claims.

It is to be noted that the relational terms herein, such as "first" and "second", are used only for differentiating one entity or operation, from another entity or operation, which, however do not necessarily require or imply that there should be any real relationship or sequence. Moreover, the terms "comprise", "include," or any other variations thereof are meant to cover non-exclusive including, so that the process, method, article or device comprising a series of elements do not only comprise those elements, but also comprise other elements that are not explicitly listed or also comprise the inherent elements of the process, method, article or device. In the case that there are no more restrictions, an element qualified by the statement "comprises a . . . " does not exclude the presence of additional identical elements in the process, method, article or device that comprises the said element.

The method and apparatus provided by the embodiments of the present disclosure are described in detail. Specific examples are used herein to illustrate the principles and implementations of the present disclosure. The description of the above embodiments is only used to help understand the method and its core idea of the present disclosure. Meanwhile, for those skilled in the art, according to the idea of the present disclosure, there will be changes in the specific implementation and the scope of the present disclosure. In conclusion, the content of the present disclosure should not be construed as reference limitation of the present disclosure.

According to an aspect of the present disclosure, there is provided an information sending method, performed by a terminal, the method including: sending inactive paging restriction information to a network-side device, where the inactive paging restriction information is configured to indicate a condition for the network-side device to restrict paging of the terminal when the terminal is in an inactive state.

In an embodiment, the inactive paging restriction information is configured to indicate at least one of: restricting all paging; restricting paging for other types of service than one or more target types of service; restricting paging for other sessions than one or more target protocol data unit (PDU) sessions; or restricting paging for services and/or PDU sessions corresponding to other priorities lower than a target priority.

In an embodiment, a plurality of subscriber identity module (SIM) cards are provided in the terminal, and the inactive paging restriction information is configured to indicate a condition for the network-side device to restrict paging of at least one of the plurality of SIM cards when the at least one of the plurality of SIM cards is in an inactive state.

In an embodiment, the plurality of SIM cards includes a first SIM card and a second SIM card, and the method further includes: when switching from the first SIM card to the second SIM card, determining a second priority of the second SIM card for a service and/or a protocol data unit (PDU) session; and generating the inactive paging restriction information according to the second priority, where the inactive paging restriction information is configured to indicate that a condition for the network-side device to restrict paging of the first SIM card when the first SIM card is in an inactive state includes: restricting paging of services and/or PDU sessions corresponding to other priorities lower than the second priority.

In an embodiment, the plurality of SIM cards correspond to an association relationship between services and/or PDU sessions and priorities, or each of the plurality of SIM cards respectively corresponds to an association relationship between services and/or PDU sessions and priorities.

In an embodiment, the method further includes: sending updated information of the inactive paging restriction information to the network-side device.

In an embodiment, sending the updated information of the inactive paging restriction information to the network-side device includes: sending the updated information of the inactive paging restriction information to the network-side device when satisfying at least one of: a duration of communication using the second SIM card is greater than a duration threshold; or a data amount of data transmitted using the second SIM card is greater than a data amount threshold.

In an embodiment, the network-side device includes at least one of: a base station; or a core network.

In an embodiment, the network-side device includes the base station, and the inactive paging restriction information is carried in radio resource control (RRC) signaling.

In an embodiment, the inactive paging restriction information is carried in the user equipment (UE) assistance information of the RRC signaling.

In an embodiment, the inactive paging restriction information is carried in a newly added information element (IE) of the UE assistance information.

In an embodiment, the UE assistance information is further configured to indicate a RRC state that the terminal expects to enter.

In an embodiment, the UE assistance information indicates the RRC state that the terminal expects to enter in an explicit manner and/or an implicit manner.

In an embodiment, the network-side device includes a 5th generation mobile communication technology (5G) core network, and the inactive paging restriction information is carried in at least one of: a service request message; or registration request signaling.

In an embodiment, the method further includes: sending restriction release information to the network-side device, where the restriction release information is configured to indicate to the network-side device to release part or all of paging restrictions on the terminal when the terminal is in the inactive state.

In an embodiment, the inactive paging restriction information is further configured to indicate a duration for the network-side device to restrict the paging of the terminal when the terminal is in the inactive state.

According to an aspect of the present disclosure, there is provided a paging restriction method, performed by a network-side device, the method including: receiving inactive paging restriction information, where the inactive paging restriction information is configured to indicate a condition for the network-side device to restrict paging of a terminal when the terminal is in an inactive state.

In an embodiment, the method further includes: restricting the paging of the terminal when the terminal is in the inactive state according to the condition.

In an embodiment, the network-side device includes at least one of: a base station; or a core network.

In an embodiment, the network-side device includes the base station, and receiving the inactive paging restriction information includes: receiving the inactive paging restriction information from a core network and/or the terminal.

In an embodiment, restricting the paging of the terminal when the terminal is in the inactive state according to the condition includes: storing the condition in a context of the terminal; querying the context of the terminal when the terminal needs to be paged; and restricting the paging of the terminal based on the condition found in the context of the terminal.

In an embodiment, the base station receives the inactive paging restriction information from the terminal, and the method further includes: sending the inactive paging restriction information to a core network after indicating the terminal to enter the inactive state.

In an embodiment, the method further includes: sending the inactive paging restriction information to other base stations in a radio access network (RAN) notification area (RNA) where the terminal is located.

In an embodiment, the method further includes: receiving data sent by a core network to the terminal in the inactive state; and paging the terminal when the data includes data that is not restricted by the condition.

In an embodiment, the network-side device includes the core network, and receiving the inactive paging restriction information includes: receiving the inactive paging restriction information from a base station and/or the terminal.

In an embodiment, the core network receives the inactive paging restriction information from the base station, and the method further includes: sending configuration information to the base station, where the configuration information is configured to configure the base station to send the inactive paging restriction information to the core network after indicating the terminal to enter the inactive state.

In an embodiment, the core network receives the inactive paging restriction information from the terminal, and the inactive paging restriction information is carried in at least one of: a service request message; or registration request signaling.

In an embodiment, restricting the paging of the terminal when the terminal is in the inactive state according to the condition includes: sending the inactive paging restriction information to one or more base stations, and indicating to the one or more base stations to restrict the paging of the terminal according to the condition in the inactive paging restriction information.

In an embodiment, the one or more base stations include at least one of: base stations in a radio access network (RAN) notification area (RNA) where the terminal is located; or one or more base stations connected to the terminal.

In an embodiment, the inactive paging restriction information is carried in radio resource control (RRC) inactive assistance information and sent to the one or more base stations connected to the terminal; and/or the inactive paging restriction information is carried in a mobility restriction list information unit and sent to the base stations in the RNA where the terminal is located.

In an embodiment, the network-side device includes the core network, and restricting the paging of the terminal when the terminal is in the inactive state according to the condition includes: when data needs to be sent to the terminal in the inactive state, determining whether the data includes data that is not restricted by the condition; and when the data includes the data that is not restricted by the condition, sending the data to an anchor base station of the terminal.

In an embodiment, the method further includes: receiving restriction release information sent by the terminal; and releasing part or all of paging restrictions on the terminal when the terminal is in the inactive state.

In an embodiment, the method further includes: determining a duration of restricting the paging of the terminal based on the inactive paging restriction information; and after the duration, releasing part or all of the paging restrictions on the terminal when the terminal is in the inactive state.

According to an aspect of the present disclosure, there is provided an information sending apparatus, including one or more processors configured to send inactive paging restriction information to a network-side device, where the inactive paging restriction information is configured to indicate a condition for the network-side device to restrict paging of the terminal when the terminal is in an inactive state.

According to an aspect of the present disclosure, there is provided a paging restriction apparatus, including one or more processors configured to receive inactive paging restriction information, where the inactive paging restriction information is configured to indicate a condition for a network-side device to restrict paging of a terminal when the terminal is in an inactive state.

According to an aspect of the present disclosure, there is provided a communication apparatus, including: a processor; and a memory configured to store a computer program; where when the computer program is executed by the processor, the information sending method according to any one of the above embodiments is implemented.

According to an aspect of the present disclosure, there is provided a communication apparatus, including: a processor; and a memory configured to store a computer program; where when the computer program is executed by the processor, the paging restriction method according to any one of the above embodiments is implemented.

According to an aspect of the present disclosure, there is provided a computer readable storage medium storing a computer program, where when the computer program is executed by a processor, the steps of the information sending method according to any one of the above embodiments are implemented.

According to an aspect of the present disclosure, there is provided a computer readable storage medium storing a computer program, where when the computer program is executed by a processor, the steps of the paging restriction method according to any one of the above embodiments are implemented.

The invention claimed is:

1. An information sending method, performed by a terminal, the terminal at least being provided with a first subscriber identity module (SIM) card and a second SIM card, the method comprising:

sending inactive paging restriction information to a network-side device through the first SIM card being used, wherein the inactive paging restriction information is configured to indicate a condition for the network-side device to restrict paging of the second SIM card when the second SIM card is in an inactive state, wherein the condition comprises restricting paging for at least one of services or protocol data unit (PDU) sessions corresponding to other priorities lower than a target priority; and after switching from the first SIM card to the second SIM card, and in a case that a duration of communication using the second SIM card is greater than a duration threshold or a data amount of data transmitted using the second SIM card is greater than a data amount threshold, sending updated information of the inactive paging restriction information for the first SIM card to the network-side device, wherein the updated information comprises reduced target priority.

2. The method according to claim 1, wherein a plurality of SIM cards are provided in the terminal, the plurality of SIM cards comprise the first SIM card and the second SIM card, and the inactive paging restriction information is configured to indicate a condition for the network-side device to restrict paging of at least one SIM card, other than the second SIM card, of the plurality of SIM cards when the at least one SIM card is in an inactive state.

3. The method according to claim 2, wherein the method further comprises:

switching from the first SIM card to the second SIM card, and determining a second priority of the second SIM card for at least one of a service or a protocol data unit (PDU) session; and generating the inactive paging restriction information according to the second priority, wherein the inactive paging restriction information is configured to indicate that a condition for the network-side device to restrict paging of the first SIM card when the first SIM card is in an inactive state comprises: restricting paging of at least one of services or PDU sessions corresponding to other priorities lower than the second priority.

4. The method according to claim 3, wherein the plurality of SIM cards correspond to an association relationship between at least one of services or PDU sessions and priorities, or each of the plurality of SIM cards respectively corresponds to an association relationship between at least one of services or PDU sessions and priorities.

5. The method according to claim 1, wherein the network-side device comprises a base station, and the inactive paging restriction information is carried in radio resource control (RRC) signaling;

wherein the inactive paging restriction information is carried in user equipment (UE) assistance information of the RRC signaling;

wherein the method comprises at least one of:

the inactive paging restriction information is carried in a newly added information element (IE) of the UE assistance information;

or the UE assistance information is further configured to indicate a RRC state that the terminal expects to enter, wherein the UE assistance information indicates the RRC state that the terminal expects to enter in at least one of an explicit manner or an implicit manner.

6. The method according to claim 1, wherein the network-side device comprises a core network, and the inactive paging restriction information is carried in at least one of:

a service request message; or registration request signaling.

7. The method according to claim 1, wherein the method comprises at least one of:

sending restriction release information to the network-side device, wherein the restriction release information is configured to indicate the network-side device to release part or all of paging restrictions on the terminal when the terminal is in the inactive state;

or the inactive paging restriction information is further configured to indicate a duration for the network-side device to restrict paging of the terminal when the terminal is in the inactive state.

8. A non-transitory computer readable storage medium storing a computer program, wherein the computer program when executed by a processor causes the processor to execute the information sending method according to claim 1.

9. A paging restriction method, performed by a network-side device, the paging restriction method comprising:

receiving inactive paging restriction information sent through a first subscriber identity module (SIM) card being used by a terminal, wherein the inactive paging restriction information is configured to indicate a condition for the network-side device to restrict paging of a second SIM card of the terminal when the second SIM card is in an inactive state, wherein the condition comprises restricting paging for at least one of services or protocol data unit (PDU) sessions corresponding to other priorities lower than a target priority; and receiving updated information of the inactive paging restriction information for the first SIM card, wherein the updated information is sent by the terminal after switching from the first SIM card to the second SIM card, and in a case that a duration of communication using the second SIM card is greater than a duration threshold or a data amount of data transmitted using the second SIM card is greater than a data amount threshold, wherein the updated information comprises reduced target priority.

10. The paging restriction paging restriction method according to claim 9, further comprising:

restricting the paging of the second SIM card when the second SIM card is in the inactive state according to the condition.

11. The paging restriction method according to claim 10, wherein the network-side device comprises a base station, and receiving the inactive paging restriction information comprises:

receiving the inactive paging restriction information from at least one of a core network or the terminal.

12. The paging restriction method according to claim 11, wherein the paging restriction method further comprises at least one of:

restricting the paging of the terminal when the terminal is in the inactive state according to the condition comprises:

storing the condition in a context of the terminal;

querying the context of the terminal when the terminal needs to be paged; and restricting the paging of the terminal based on the condition found in the context of the terminal;

or the base station receives the inactive paging restriction information from the terminal, and the paging restriction method further comprises: sending the inactive paging restriction information to the core network after indicating the terminal to enter the inactive state.

13. The paging restriction method according to claim 11, further comprising at least one of:

sending the inactive paging restriction information to other base stations in a radio access network (RAN) notification area (RNA) where the terminal is located;

or receiving data sent by the core network to the terminal in the inactive state;

and paging the terminal when the data comprises data that is not restricted by the condition.

14. The paging restriction method according to claim 10, wherein the network-side device comprises a core network, and receiving the inactive paging restriction information comprises:

receiving the inactive paging restriction information from at least one of a base station or the terminal.

15. The paging restriction method according to claim 14, wherein the core network receives the inactive paging restriction information from the base station, and the paging restriction method further comprises:

sending configuration information to the base station, wherein the configuration information is configured to configure the base station to send the inactive paging restriction information to the core network after indicating the terminal to enter the inactive state;

or the core network receives the inactive paging restriction information from the terminal, and the inactive paging restriction information is carried in at least one of: a service request message; or registration request signaling;

wherein restricting the paging of the terminal when the terminal is in the inactive state according to the condition comprises: sending the inactive paging restriction information to one or more base stations, and indicating the one or more base stations to restrict the paging of the terminal according to the condition in the inactive paging restriction information;

wherein the one or more base stations comprises at least one of: base stations in a radio access network (RAN) notification area (RNA) where the terminal is located; or one or more base stations connected to the terminal;

wherein the inactive paging restriction information is carried in radio resource control (RRC) inactive assistance information and sent to the one or more base stations connected to the terminal; or the inactive paging restriction information is carried in a mobility restriction list information unit and sent to the base stations in the RNA where the terminal is located.

16. The paging restriction method according to claim 10, wherein the network-side device comprises a core network, and restricting the paging of the terminal when the terminal is in the inactive state according to the condition comprises:

wherein data needs to be sent to the terminal in the inactive state, determining whether the data comprises data that is not restricted by the condition; and wherein the data comprises the data that is not restricted by the condition, sending the data to an anchor base station of the terminal.

17. The paging restriction method according to claim 9, further comprising at least one of:

receiving restriction release information sent by the terminal; and releasing part or all of paging restrictions on the terminal when the terminal is in the inactive state;

or determining a duration of restricting the paging of the terminal based on the inactive paging restriction information; and after the duration, releasing part or all of paging restrictions on the terminal when the terminal is in the inactive state.

18. A non-transitory computer readable storage medium storing a computer program, wherein the computer program when executed by a processor cause the processor to execute the paging restriction method according to claim 9.

19. A communication apparatus, comprising:

one or more processors; and a memory configured to store a computer program;

wherein the one or more processors are collectively configured to:

send inactive paging restriction information to a network-side device through a first subscriber identity module (SIM) card being used by a terminal, wherein the inactive paging restriction information is configured to indicate a condition for the network-side device to restrict paging of a second SIM card of the terminal when the second SIM card is in an inactive state, wherein the condition comprises restricting paging for at least one of services or protocol data unit (PDU) sessions corresponding to other priorities lower than a target priority; and after switching from the first SIM card to the second SIM card, and in a case that a duration of communication using the second SIM card is greater than a duration threshold or a data amount of data transmitted using the second SIM card is greater than a data amount threshold, sending updated information of the inactive paging restriction information for the first SIM card to the network-side device, wherein the updated information comprises reduced target priority.

20. A communication apparatus, comprising:

one or more processors; and a memory configured to store a computer program;

wherein when the computer program is executed by the ones or more processors, the paging restriction method according to claim 9 is executed.

* * * * *